(12) United States Patent
Schlossecki et al.

(10) Patent No.: US 8,139,740 B2
(45) Date of Patent: Mar. 20, 2012

(54) METHOD FOR OPERATING A TELEPHONE SYSTEM WITH AT LEAST TWO TELEPHONY TERMINALS AND A TELEPHONY TERMINAL FOR CARRYING OUT THE METHOD

(75) Inventors: Dirk Schlossecki, Heide (DE); Michael Grün, Ahrensburg (DE); Stephan Stadler, Heusenstamm (DE); James Farber, Rumson, NJ (US); Steven Greenspan, Scotch Plains, NJ (US)

(73) Assignee: Avaya Inc., Basking Ridge, NJ (US)

( * ) Notice: Subject to any disclaimer, the term of this patent is extended or adjusted under 35 U.S.C. 154(b) by 229 days.

(21) Appl. No.: 12/336,733

(22) Filed: Dec. 17, 2008

(65) Prior Publication Data

US 2009/0232293 A1 Sep. 17, 2009

(30) Foreign Application Priority Data

Feb. 21, 2008 (EP) .................................. 08003177
May 20, 2008 (EP) .................................. 08009237

(51) Int. Cl.
*H04M 3/42* (2006.01)
*H04M 3/44* (2006.01)
*H04M 1/27* (2006.01)
*H04M 3/54* (2006.01)

(52) U.S. Cl. ......... 379/201.01; 379/201.02; 379/207.02; 379/211.02; 379/216.01; 379/355.01; 379/915

(58) Field of Classification Search .................. None
See application file for complete search history.

(56) References Cited

U.S. PATENT DOCUMENTS 4,788,720 A 11/1988 Brennan et al.
2002/0136386 A1* 9/2002 Berger .......................... 379/219
2009/0225969 A1* 9/2009 Lankes et al. ............. 379/201.04

FOREIGN PATENT DOCUMENTS

DE 19752403 5/1999
EP 1215869 6/2002

* cited by examiner

*Primary Examiner* — Harry Hong
(74) *Attorney, Agent, or Firm* — Sheridan Ross P.C.

(57) ABSTRACT

A method for operating a telephone system with at least two telephony terminals to where, in addition to voice data or user data, functional data is transmitted by means of special functions of the telephone system, such as forwarding or holding established call connections. It shall be possible in a simple way for the user to handle even a relatively large multitude of special functions. For this purpose, according to the invention, an action key of a first telephony terminal, provided for triggering special functions is assigned the respective special function to be triggered, depending on its own status or the status of a second telephony terminal within the same team.

12 Claims, 1 Drawing Sheet

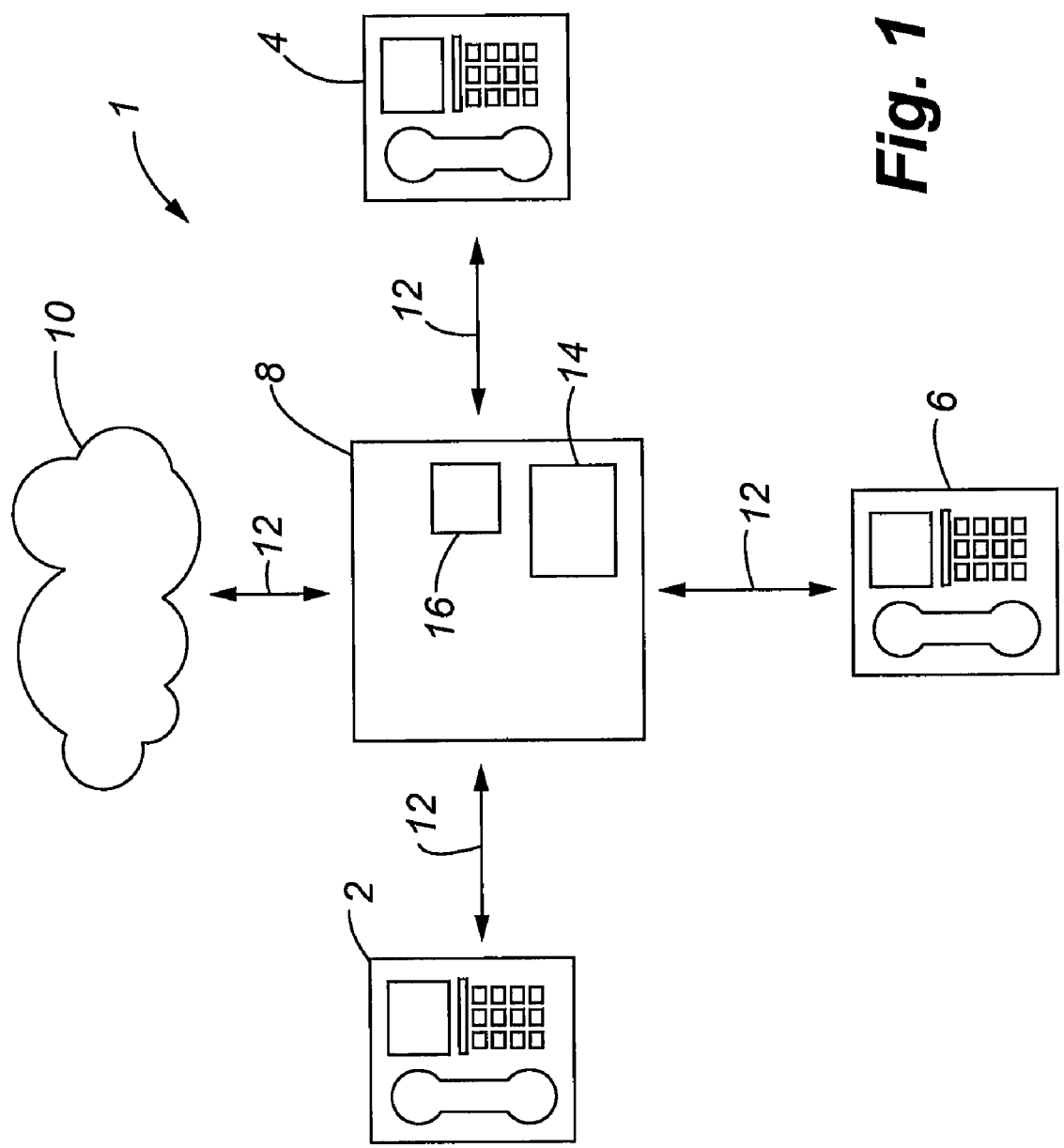

METHOD FOR OPERATING A TELEPHONE SYSTEM WITH AT LEAST TWO TELEPHONY TERMINALS AND A TELEPHONY TERMINAL FOR CARRYING OUT THE METHOD

FIELD OF INVENTION

The invention relates to a method for operating a telephone system with at least two telephony terminals, where in addition to voice data or user data, functional data are transmitted by means of special functions of the telephone system. It also relates to a telephony terminal having an action key for carrying out special functions for carrying out the method.

BACKGROUND OF THE INVENTION

In modern telephone installations or systems, usually a plurality of telephony terminals are connected to a central exchange unit, via telecommunication connections which are established between individual telephony terminals or calls coming from outside the internal telephone network to selected telephony terminals. Within the framework of these telecommunication connections, voice data or user data are transmitted to the respective selected telephony terminal from and to the central exchange unit to the respective terminal. The data can be transmitted in the conventional manner or else using an Internet Protocol.

Usually in such telephone installations or systems, in addition to the voice data or user data to and from the respective telephony terminals, further data, namely so-called functional or control data, are transmitted, which are not a direct part of the information exchanged within the communication connection, but form the foundation for carrying out so-called special functions of the telephone system. Such special functions can be, for example, setting-up or control data for activating or deactivating call forwarding operations, functions of answering machines, call charge registration or management information or the like. Alternatively, it is also possible within the framework of such special functions to transmit the telephone number or extension number of the calling party to the respective called telephony terminal and to display it there, so that the user of the called telephony terminal can get information about the calling party already at the moment when the call is coming in. If the called party is absent, telephone numbers of the calling parties can also be stored in a list of telephone numbers or calling parties of the called telephony terminal, within the framework of further special functions, so that the called party after his return to his work place, is informed about the calls that have come in and were not taken by him.

The telephony terminals of the above-mentioned telephone systems are usually provided, in addition to the telephone number keys, with action keys, which carry out preset special functions. For example, firmly stored telephone numbers or telephone numbers which can be stored by the user can be assigned to such action keys. Then, a call on the correspondingly stored telephone number is triggered by actuation of such an action key by a speed dialing key. Further action keys can be provided, for example, for taking a call temporarily and to mute it, to forward a call ("hold" function), to activate or deactivate a function of an answering machine, or the like.

In telephone systems with telephony terminals equipped in such a way, the increasing in special functions and the assignment of corresponding action keys to these special functions may lead to relatively complex and unclear keypads with a multitude of action keys. The large number of such action keys limits the clarity as well as the operatability of the respective telephony terminal.

SUMMARY OF INVENTION

Therefore, the invention is based on the task to provide a method for operating a telephone system of the above-mentioned type, enabling in a particularly simple way and in a manner which is particularly purposeful for the user to handle a relatively large multitude of special functions. Furthermore, a telephony terminal particularly suitable for carrying out the method shall be provided.

Regarding the method, an action key of a first telephony terminal is assigned an action key, which can provide for a plurality of special functions, depending on the status of the first telephony terminal and/or the status of a second telephony terminal allocated to it.

The invention is based on a flexible assignment of special functions to individual assignment keys, rather than a fixed assignment, in order to allocate the special functions more efficiently and keep the complexity of the designed telephony terminals relatively low. Thus, even where there are a large number of special functions, the number of action keys required will be relatively low. The allocation of these special functions can therefore be adapted to the user's requirements and modified according to the user's requirements. More specifically, the assignment of the special functions to the action key can depend on the status of the telephone system and/or the status of the individual telephony terminals.

In modern telephone systems, whose concept and structure may often be adapted to the structures of the respective enterprise or organization, several telephony terminals can be combined in groups, according to an organizational combination of their users. A specific group of users that have the same technical functions and form a team or unit within a enterprise or organization can use a group of telephony terminals specifically allocated to the team or unit. The group of telephony terminals are interconnected and can perform a number of group functions through flexible assignment of special function to individual action keys. For example, the group of telephony terminals can alternately monitor the operating status of individual telephony terminals of the group. Thus, a call from a second telephony terminal to a first telephony terminal first will be directed to the appropriate group of telephony terminals. Using individual action keys, it is possible to signal to the entire group or team members whether a call relating to the group whether an incoming call requested shall now be accepted.

The flexible assignment of special functions to action key is dependent on the status on the respective telephony terminals, specifically, whether a respective telephony terminal is currently engaged in an active call connection or available. For a status-dependent flexible assignment of special functions to action keys, wherein a first telephony terminal is up-dated and modified in dependence of the status of a second telephony terminal, a permanent monitoring function is installed, where the first telephony terminal permanently acquires the status of the allocated second telephony terminal, and accordingly assigns the special functions to the action keys. Additionally, the two telephony terminals can engage in reciprocal monitoring and modify the special functions assigned to the action keys in view of the status of the other telephony terminal. Such reciprocal status monitoring of individual telephony terminals can also be provided in a larger compound system of three or more telephony terminals.

In one advantageous embodiment, the action key is used in the simplest case, in which on none of the two telephony terminals concerned a call connection is being maintained, i.e. in which both the first and the second telephony terminal are currently unengaged, as a speed-dialing key for setting up a call connection in the two telephony terminals. In this case, the action key is assigned the corresponding special function "speed-dialing key to the allocated second telephony terminal".

In another advantageous embodiment, where the first telephony terminal is monitoring the second telephony terminal, the action key is assigned the special function "call take-over" when the second telephony terminal is engaged in active call connection and a second incoming call connection is directed to the second telephony terminal. In this way, the action key on the first telephony terminal is able to take a call coming in on the second telephony terminal. In another advantageous embodiment, it is possible, where several call connection requests come in simultaneously on the second telephony terminal, to trigger through the action key and an allocated selection unit a taking of one of the incoming calls by the first telephony terminal. It can be indicated to the user of the first telephony terminal, by means of suitable indicator means on the first telephony terminal, for example flashing LED's or the like, that currently one or several calls are coming in on the second telephony terminal. In this mode, the first telephony terminal is designed for monitoring the second telephony terminal.

In an alternative or additional advantageous embodiment, it is possible, by activation of the action key, to connect the first telephony terminal to a telephone conversation to a third telephony terminal, either outside or inside the telephone network, and a second telephony terminal allocated to the action key. This enables conference conversations between the first and second telephony terminals and a third telephony terminal.

In a further alternative or additional advantageous embodiment, the telephony terminals can be designed for forwarding a call coming in on the first telephony terminal to the second telephony terminal, in the manner of automatic or manually initiated call forwarding. In this case, where a call connection is still active, the action key of the first telephony terminal can temporarily be assigned the special function that the call forwarded from the first to the second telephony terminal is done by activation of the respective action key on the first telephony terminal.

For further reducing the keypads assigned with special functions on telephony terminals, the allocated second telephony terminal can, in a particularly advantageous embodiment, be determined by selection from a list—which can be shown on the display of the telephony terminal. This enables a particularly variable utilization of the action key, because in this way, the allocation can continuously be adapted to the user's requirements and be changed. In a particularly advantageous embodiment, the telephony terminal selected from the list is confirmed by actuation of the action key. In this manner, it is achieved that no additional operating keys are needed on the telephony terminal and, therefore, a very clear and logic operatability of the telephony terminal is obtained.

In another advantageous embodiment, the list is generated by actuation of the action key—for example, if no second telephony terminal was allocated yet to the action key—and shown on a display of the telephony terminal. Depending on the setting, this list will include all possible or only a limited number of preferred telephony terminals to which an allocation from the first telephony terminal is possible. The user is, therefore, in a position to select himself the desired second telephony terminal by means of an allocated selection unit and to change it, if necessary, without needing any further function keys.

With regard to the telephony terminal, the above-mentioned task is solved by an action key provided for carrying out special functions, the action key being designed for a situation or status-dependent modifiable assignment with special functions of the above-mentioned type. In order to enable a unilateral or reciprocal status monitoring of one or several other telephony terminals, the telephony terminal is preferably designed with integrated storage, individual storage areas being specifically provided and reserved for storing information of allocation to other telephony terminals or else for storing corresponding staff information.

The advantages achieved with the invention consist in particular in the fact that through the flexible, situation or status-dependent assignment of action keys with special functions, a relatively large range of special functions can be handled with a relatively small number of action keys, which are easy to survey for the user. In particular when interconnecting telephony terminals in groups, according to an analog group or function-related combination of the users in teams, team-related special functions, such as common processing, forwarding or monitoring of incoming requests of calling parties by groups, are possible. Therefore, it is possible to set up internal call cross-connections, reciprocally monitor telephone status, to reciprocally take over calls with particularly simple means and in a fast and easy manner. to set up internal call cross-connections, to reciprocally monitor the telephone status, to reciprocally take over calls, or the like.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

Preferred embodiments of the present invention are depicted in the accompanying drawing. Various features and advantages of these preferred embodiments will be better understood when the specification and claims are considered in conjunction with the accompanying drawing. It is understood that the scope of the invention is not limited by the precise features and arrangement illustrated herein.

FIG. 1 illustrates a telephone system with a plurality of internal telephony terminals connected a common central exchange unit, with the common central exchange unit connected through data or communication channels to an external telephone network.

DETAILED DESCRIPTION

An exemplary embodiment of the invention is explained in detail by means of a drawing, in which the FIGURE is a schematic representation of a telephone system.

The telephone system 1 according to the FIGURE comprises a number of telephony terminals 2,4,6, connected on the data side by a common central exchange unit 8, also designated as PBX. The central exchange unit 8, in turn, is connected with an external telephone network 10. In an exemplary embodiment, an Internet protocol is provided as the transmission medium, the central exchange unit 8 being suitable connected via the Internet with the telephone network 10. As indicated by the double arrows 12, the central exchange unit 8 is connected via suitable data or communication channels both with the external telephone network 10 and with the internal telephony terminals 2,4,6.

In operation of the telephone system 1, voice data or user data are exchanged with the telephony terminals 2,4,6, which are exchanged in a suitable compressed and digitized form, in view of the utilization of the Internet protocol provided in the exemplary embodiment. In addition to the voice data or user data, however, functional data is also transmitted via the above-mentioned communication channels, by means of the special functions of the telephone system 1. As special functions, the exemplary embodiment provides particular functions which can be activated by the individual users, such as call forwarding operations, functions of answering machines, call charge management or the like.

Furthermore, the telephony terminals 2, 4, 6 of the telephone system 1 are specifically designed for enabling the users in a team structure to handle and administrate incoming call requests in a particularly simple way. For this purpose, the telephony terminals 2, 4, 6 are designed for reciprocally monitoring each other, a signal on the status of the respective other telephony terminals 2, 4, 6 being transmitted via corresponding user data to each of the telephony terminals 2, 4, 6, indicating whether the telephony terminal 2, 4, 6 concerned is currently unengaged or engaged with a call connection.

For activation of special functions according to requirements, the telephony terminals 2, 4, 6 are provided, in addition to the telephone number keys, with further keys called action keys, each action key performing a currently assigned special function. To some of the action keys, firmly installed special functions, or else special functions which can be manually modified from a central unit and which are adapted to the user's wishes, can be assigned. In addition, however, each telephony terminal 2, 4, 6 is also provided with at least one action key designed as a so-called "team button", to which reciprocally and in dependence of the status of one or several of the other telephony terminals 2, 4, 6, a corresponding special function is assigned. Each telephony terminal 2, 4, 6 is, furthermore, provided with an integrated storage, in which the telephony terminal or terminals 2, 4, 6 to be currently monitored is/are indexed in a specifically provided storage area.

As the special functions assigned to the respective action key or "team button", another exemplary embodiment provides the following:

If both the monitoring and the monitored telephony terminal 2, 4, 6 are currently unengaged or if at least no incoming call is currently registered, the speed-dialing function to the second telephony terminal 2, 4, 6 is assigned to the respective action key. If, on the other hand, a call connection request ("incoming call") coming in on a second, monitored telephony terminal 2, 4, 6 is registered at the monitoring telephony terminal 2, 4, 6, the special function "taking of call" will be assigned to the respective action key, so that the taking of the call is transferred to the first telephony terminal 2, 4, 6. If, however, a call connection request ("incoming call") is coming in on the first telephony terminal 2, 4, 6, the special function "forwarding to the second telephony terminal" will be assigned to the respective action key. In this case, it is, therefore, possible for the user of the first telephony terminal 2, 4, 6 to refrain from taking the call and to forward the call instead to the allocated second telephony terminal 2, 4, 6 by activating the action key.

In addition, the telephony terminals 2, 4, 6 are also provided with suitable indicator means, to indicate the calls coming in or also calls coming in on the other telephony terminals 2, 4, 6, through flashing LED's or the like, so that the user of each telephony terminal 2, 4, 6 is informed in an appropriate manner about the call status of the other telephony terminals 2, 4, 6, too. Furthermore, the telephony terminals 2, 4, 6 are provided with suitable indicator devices, such as a display, so that further status or supplementary information about a call coming in on the respective telephony terminal 2, 4, 6, or the telephony terminal monitored by it, or the telephone number of the calling party, can be indicated. In the exemplary embodiment, this indicator means is also linked with the special functions for the variably assignable action key.

For example, for the case of taking over a call through the respective action key, it is provided that in case where there is a call coming in on the second telephony terminal 2, 4, 6, this status is first of all indicated by a suitable indicator means on the first, monitoring telephony terminal 2, 4, 6. By pressing the variably assignable action key a first time, the user of the first telephony terminal 2, 4, 6 can have the corresponding indicator unit in the first telephony terminal 2, 4, 6 indicate the appropriate supplementary information, such as the telephone number of the device calling the second, monitored telephony terminal 2, 4, 6. Then, the user of the first telephony terminal 2, 4, 6 can occasion, by pressing the action key again, to which in the meantime another special function had been assigned, the transfer of the call coming in on the second telephony terminal 2, 4, 6, to the first telephony terminal 2, 4, 6.

It is furthermore provided that by pressing the action key in the case that no second telephony terminal (2, 4, 6) has been allocated to the first telephony terminal (2, 4, 6), a list of those telephony terminals (2, 3, 6) or groups will be generated to which an allocation is possible. First of all, a user profile can be loaded from the allocated integrated storage containing preferred telephony terminals (2, 4, 6) or groups, which are positioned in the first positions of the list shown on the display. Within this list, the user can then navigate by means of an allocated selection unit and confirm the allocation by pressing the action key again.

Therefore, functions can be executed by means of the team button directly in dependence of the current status of the second telephony terminal (2, 4 6) allocated to the team or indirectly through prior selection from the available telephony terminals (2, 4, 6) from a list.

If the team button is allocated to a user group, the status of the user group is signaled to the user in the exemplary embodiment by means of an LED. A quickly flashing LED means in this case that there is an unanswered call request on at least one telephony terminal (2, 4, 6) of the user group. A slowly flashing LED means that there is no unanswered call request on any telephony terminal (2, 4, 6) of the user group, but that at least one telephony terminal (2, 4, 6) of the user group is parking a connection ("on-hold" function). In the first case, an activation of the team button will set up a connection with the caller of the unanswered call request, and in the second case, to the caller of the parked call. If no unanswered call requests or parked calls exist, a permanent lighting of the LED means that there is an active call connection on at least one telephony terminal (2, 4, 6) of the user group. If all telephony terminals (2, 4, 6) of the user group are free, the LED allocated to the team button will not light.

In this way, it is achieved that the status-dependent allocation of the functions of the team button will work in a similar manner also if it is allocated to a user group. It makes no difference for the user whether only one telephony terminal (2, 3, 6) or a plurality thereof in the form of a user group is allocated to the team button. If several telephony terminals (2, 4, 6) are simultaneously in the same status, the desired telephony terminal (2, 4, 6) will easily be selected by means of the selection unit through the display.

A number of variations and modifications of the invention can be used. It would be possible to provide for some features of the invention without providing others.

The exemplary systems and methods of this invention have been described in relation to STB's and profile(s). However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network 10, such as a LAN, cable network, and/or the Internet, or within a dedicated system. Thus, it should be appreciated, that the components of the system can be combined in to one or more devices, such as a STB, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, in one or more communications devices, at one or more users' premises, or some combination thereof. Similarly, one or more functional portions of the system could be distributed between a communications device(s), such as a STB, and an associated computing device. The one or more functional portions of the system could be also be installed in a TV or TV tuner card, such as those installed in a computer.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

LIST OF REFERENCE NUMBERS

1 Telephone system
2, 4, 6 Telephony terminal
8 Exchange unit
10 Telephone network
12 Double arrows

The invention claimed is:

1. A method for operating a telephone system having at least two telephony terminals where functional data can be transmitted through special functions of the telephone system comprising:
   allocating a second telephony terminal to a first telephony terminal through selection from a list;
   assigning a respective function to an action key of the first telephony terminal depending on the status of the first or second telephony terminal; and
   triggering, by a processor, the respective function by actuation of the action key of the first telephony terminal.

2. The method of claim 1, wherein in the case of available first and second telephony terminals, a call connection between the two telephony terminals is triggered by actuation of the action key.

3. The method of claim 1, wherein in the case of a call coming in on the second telephony terminal, a taking of the call by the first telephony terminal is triggered by actuation of the action key.

4. The method of claim 1, wherein in the case of several calls coming in simultaneously on the second telephony terminal, taking of one of the incoming calls by the first telephony terminal is triggered by the action key and an allocated selection unit.

5. The method of claim 1 wherein in the case of an active telephone conversation between a third terminal and the second terminal, the action key connects the first terminal to the telephone conversation.

6. The method of claim 1, wherein an incoming call, which had been forwarded before by the first telephony terminal to the second terminal is retrieved by the first terminal by means of the action key.

7. The method of claim 1, wherein the allocation of the second telephony terminal selected from the list to the first telephony terminal is triggered by the action key.

8. The method of claim 1, wherein the list of the telephony terminals available for allocation is activated by pressing the action key.

9. The method of claim 1, wherein an action key triggers special functions.

10. The method of claim 1, wherein the telephony terminals include an integrated storage, respectively, and further comprising selecting storage areas in the integrated storage for storing allocation information on other telephony terminals 11. A telephone system including at least two telephony terminals, wherein functional data can be transmitted through special functions of the telephone system between the at least two telephony terminals comprising:
    a processor that allocates a second telephony terminal to a first telephony terminal through selection from a list, assigns a respective function to an action key of the first telephony terminal depending on the status of the first or second telephony terminal, and triggers the respective function by actuation of the action key of the first telephony terminal.

12. A non-transitory computer-readable information storage media having stored thereon instructions, that when executed by a processor, cause to be performed a method for operating a telephone system having at least two telephony terminals where functional data can be transmitted through special functions of the telephone system comprising:
    allocating a second telephony terminal to a first telephony terminal through selection from a list;
    assigning a respective function to an action key of the first telephony terminal depending on the status of the first or second telephony terminal; and
    triggering the respective function by actuation of the action key of the first telephony terminal.

\* \* \* \* \*